(12) United States Patent
Meng

(10) Patent No.: US 10,063,412 B2
(45) Date of Patent: Aug. 28, 2018

(54) NETWORK DEVICE DETECTING METHOD AND APPARATUS, AND CLOUD DETECTION SYSTEM

(71) Applicant: ZTE Corporation, Shenzhen, Guangdong (CN)

(72) Inventor: Wei Meng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 233 days.

(21) Appl. No.: 14/784,999

(22) PCT Filed: Apr. 4, 2014

(86) PCT No.: PCT/CN2014/074848
§ 371 (c)(1),
(2) Date: Oct. 16, 2015

(87) PCT Pub. No.: WO2014/169765
PCT Pub. Date: Oct. 23, 2014

(65) Prior Publication Data
US 2016/0072671 A1    Mar. 10, 2016

(30) Foreign Application Priority Data
Apr. 19, 2013  (CN) .......................... 2013 1 0138033

(51) Int. Cl.
*G06F 15/177*  (2006.01)
*H04L 12/24*  (2006.01)
(Continued)

(52) U.S. Cl.
CPC ...... *H04L 41/0806* (2013.01); *H04L 41/0853* (2013.01); *H04L 63/1433* (2013.01);
(Continued)

(58) Field of Classification Search
CPC ............. H04L 41/0213; H04L 41/0806; H04L 41/0853; H04L 41/5096; H04L 41/12;
(Continued)

(56) References Cited

U.S. PATENT DOCUMENTS 7,821,937 B1    10/2010  Guo
8,248,958 B1    8/2012   Tulasi
(Continued)

FOREIGN PATENT DOCUMENTS

CN    101996451 A    3/2011
CN    102081714 A    6/2011
(Continued)

OTHER PUBLICATIONS

International Search Report in international application No. PCT/CN2014/074848, dated Jul. 8, 2014, 2 pgs.
(Continued)

*Primary Examiner* — Jungwon Chang
(74) *Attorney, Agent, or Firm* — Cooper Legal Group, LLC (57) ABSTRACT

Provided are a method, apparatus and a cloud detection system for detecting a network device. The method includes that a detection packet library is created based on characteristic information and service configuration of a network device; characteristic information and service configuration of a to-be-detected network device are acquired; a detection packet is matched in the detection packet library according to the acquired characteristic information and service configuration of the to-be-detected network device, and the to-be-detected network device is detected by using the matched detection packet.

21 Claims, 5 Drawing Sheets

(51) Int. Cl.
*H04L 29/06* (2006.01)
*G06F 21/57* (2013.01)
*G06F 21/56* (2013.01)
*H04L 12/26* (2006.01)

(52) U.S. Cl.
CPC ............ *G06F 21/56* (2013.01); *G06F 21/577* (2013.01); *H04L 41/0213* (2013.01); *H04L 41/5096* (2013.01); *H04L 43/50* (2013.01); *H04L 63/20* (2013.01)

(58) Field of Classification Search
CPC ..... H04L 41/0843; H04L 43/50; H04L 67/02; H04L 63/1433; H04L 63/20; G06F 9/5072; G06F 21/577; G06F 21/56
USPC ............... 709/224, 217, 213, 220, 226, 222; 726/25
See application file for complete search history.

(56) References Cited

U.S. PATENT DOCUMENTS

| | | | |
|---|---|---|---|
| 2006/0130146 | A1 | 6/2006 | Choi |
| 2010/0106742 | A1* | 4/2010 | Guruswamy ........... H04L 41/12 707/773 |
| 2012/0124074 | A1 | 5/2012 | Sharma |
| 2012/0254353 | A1* | 10/2012 | Baba ................... H04L 12/4633 709/217 |
| 2012/0303790 | A1* | 11/2012 | Singh ................... G06F 9/5072 709/224 |
| 2013/0111036 | A1* | 5/2013 | Ozawa ................. H04L 41/0843 709/226 |
| 2013/0198346 | A1* | 8/2013 | Jubran .................... H04L 41/12 709/220 |
| 2014/0006597 | A1* | 1/2014 | Ganguli ................ G06F 9/5072 709/224 |
| 2014/0040174 | A1* | 2/2014 | Leung .................. G06N 99/005 706/12 |
| 2014/0195635 | A1* | 7/2014 | Li .......................... H04L 67/02 709/213 |
| 2015/0058287 | A1* | 2/2015 | Zhang ............... G06F 17/30575 707/610 |

FOREIGN PATENT DOCUMENTS

| | | |
|---|---|---|
| CN | 102082659 A | 6/2011 |
| CN | 102142988 A | 8/2011 |
| CN | 102523221 A | 6/2012 |
| CN | 102736978 A | 10/2012 |
| CN | 102843269 A | 12/2012 |
| EP | 2640002 A1 | 9/2013 |
| WO | 2012089075 A1 | 7/2012 |

OTHER PUBLICATIONS

English Translation of the Written Opinion of the International Search Authority in international application No. PCT/CN2014/074848, dated Jul. 8, 2014, 12 pgs.

Supplementary European Search Report in European application No. 14786046.4, dated Apr. 15, 2016.

* cited by examiner

NETWORK DEVICE DETECTING METHOD AND APPARATUS, AND CLOUD DETECTION SYSTEM

TECHNICAL FIELD

The disclosure relates to the technical field of Internet apparatuses, particularly to a method, an apparatus and a cloud detection system for detecting a network device.

BACKGROUND

Network device detection and failure discover technology, which is a technology capable of effectively discovering a latent defect and a hidden backdoor of a network device running currently, has become one of the hotspots of researches on network security, and it is of important practical significance to analyze and reach a safety technology for network device detection that detects a defect and a backdoor.

Network device detection is a technology for testing system performance remotely or locally, and fundamentals of network device detection include that possible defects of a target network device are detected one by one by sending, to a target router, a switch or a firewall, various packets constructed in a simulated manner, so as to evaluate the system reliability of objects including the router, the switch and the firewall and so on. People are able to discover an open port in a network and a host, a provided server, some system information, incorrect configuration, a known loophole, an unknown loophole, a back door and so on by means of a detection technology based on a packet. Therefore, the network device detection technology is an extremely effective automatic test technology that can discover a hidden trouble of a apparatus during a purchase of a user, a test, and operation of a current network, thereby providing powerful technical support for user procurement and evaluation of the reliability of a network device.

At present, only one kind of detection software or several kinds of fixed detection software are installed in most scanning clients of a majority of network devices or clients for network device detection, thus no detection software is able to scan and test defects of all network devices. In the meanwhile, most test cases, especially test cases of new technical standards, need to be added by a user manually, which increases the difficulty and cost of maintenance and development while cases and packet libraries can be hardly supplement completely.

Besides, an existing network scanning technology without a single and clear objective fails to discover a loophole of a router, a switch or a firewall effectively and is not associated with such a service as a routing protocol, Multi-Protocol Label Switching (MPLS), Internet Protocol Security (IPsec) not provided by the existing network scanning technology but existing in a network, thus a loophole and a defect of the service cannot be discovered in a purposeful way.

SUMMARY

Embodiments of the disclosure provide a method, an apparatus and a cloud detection system for detecting a network device to solve an existing technical problem.

An embodiment of the disclosure provides a method for detecting a network device, including that:

a detection packet library is created based on characteristic information and service configuration of a network device;

characteristic information and service configuration of a to-be-detected network device are acquired;

a detection packet is matched in the detection packet library according to the acquired characteristic information and service configuration of the to-be-detected network device, and the to-be-detected network device is detected by using the matched detection packet.

The method may further include that a response action library corresponding to the detection packet library is created based on the characteristic information and the service configuration of the network device;

accordingly, a response of the to-be-detected network device is compared with the response action library when the to-be-detected network device is detected, so as to judge whether a action of the detected network device is legal.

The characteristic information and the service configuration of the to-be-detected network device are acquired through a Simple Network Management Protocol (SNMP), a Network Configuration (NETCONF) protocol or a customer-provided equipment wide area network management protocol TR-069.

The characteristic information of the network device may include a type and a model of the network device; when the detection packet library is created, a type of the service configuration of the network device at least includes one of the followings: interface information, configuration of an Internet Protocol (IP) address, configuration of a Virtual Local Area Network (VLAN), routing configuration, MPLS, and protocol configuration.

The detection packet library may include a general detection packet library and a random detection packet library corresponding to the type of the network device;

the method may further include that the to-be-detected network device is detected by using a packet in the general detection packet library and a packet in the random detection packet library, and whether there is a loophole and a backdoor in the to-be-detected network device is judged according to a response of the to-be-detected network device.

The method may further include that the detection packet library is maintained and updated when the characteristic information and the service configuration of the network device change.

An embodiment of the disclosure further provides an apparatus for detecting a network device, including a detection processing module and a detection interface module, wherein the detection processing module is configured to create a detection packet library based on characteristic information and service configuration of a network device; match a detection packet in the detection packet library according to characteristic information and service configuration of a to-be-detected network device, wherein the characteristic information and the service configuration of the to-be-detected network device are acquired by the detection interface module, send the detection packet to the detection interface module to detect the to-be-detected network device through the detection interface module;

the detection interface module is configured to acquire the characteristic information and the service configuration of the to-be-detected network device and send the characteristic information and the service configuration of the to-be-detected network device to the detection processing module.

The detection processing module may be further configured to create a response action library corresponding to the detection packet library based on the characteristic information and the service configuration of the network device, and compare a response of the to-be-detected network device with the response action library when the to-be-detected network device is detected, so as to judge whether a action of the detected network device is legal;

accordingly, the detection interface module may be further configured to notify the response of the to-be-detected network device to the detection processing module.

The detection interface module may be configured to acquire the characteristic information and the service configuration of the to-be-detected network device through an SNMP, an NETCONF protocol or a customer-provided equipment wide area network management protocol TR-069.

The characteristic information of the network device may include a type and a model of the network device; when the detection packet library is created, a type of the service configuration of the network device at least includes one of the followings: interface information, configuration of an IP address, configuration of a VLAN, routing configuration, MPLS, and protocol configuration.

The detection packet library may include a general detection packet library and a random detection packet library corresponding to the type of the network device;

accordingly, the detection processing module may be further configured to detect the to-be-detected network device by using a packet in the general detection packet library and a packet in the random detection packet library, and judge whether there is a loophole and a backdoor in the to-be-detected network device according to a response of the to-be-detected network device;

the detection interface module may be further configured to notify the response of the to-be-detected network device to the detection processing module.

The detection processing module may be further configured to maintain and update the detection packet library when the characteristic information and the service configuration of the network device change.

An embodiment of the disclosure further provides a cloud detection system applying the apparatus for detecting a network device, including a cloud detection data center, a detection client, and a network device, wherein the cloud detection data center is configured to create a detection packet library based on characteristic information and service configuration of each network device; match a detection packet in the detection packet library according to the characteristic information and the service configuration acquired by the detection client, send the detection packet to the detection client to detect a to-be-detected network device through the detection client;

the detection client is configured to acquire characteristic information and the service configuration of the to-be-detected network device and send the characteristic information and the service configuration of the to-be-detected network device to the cloud detection data center.

A detection processing module may be located in the cloud detection data center and the a detection interface module may be located in the detection client;

the detection processing module may be configured to create the detection packet library based on the characteristic information and the service configuration of the each network device; match the detection packet in the detection packet library according to the characteristic information and the service configuration of the to-be-detected network device, wherein the characteristic information and the service configuration of the to-be-detected network device are acquired by the detection interface module, send the detection packet to the detection interface module to detect the to-be-detected network device through the detection interface module;

the detection interface module is configured to acquire the characteristic information and the service configuration of the to-be-detected network device and send the characteristic information and the service configuration of the to-be-detected network device to the detection processing module.

An embodiment of the disclosure further provides a computer storage medium. The computer storage medium includes a group of instructions which, when executed, cause at least one processor to execute the method for detecting a network device according to the claims.

The embodiments of the disclosure at least have the following advantages by applying the foregoing technical solution:

the method, apparatus and cloud detection system for detecting a network device according to the embodiments of the disclosure can discover a service loophole and a defect of the network device in a purposeful way.

BRIEF DESCRIPTION OF THE DRAWINGS

In the accompanying drawings (which are not necessarily drawn to scale), similar numerals may describe similar components in different views, and similar numerals having different letter suffixes may represent different examples of similar components. The accompanying drawings generally illustrate, by means of examples, but not by means of limitation, various embodiments discussed herein.

DETAILED DESCRIPTION

The disclosure will be expounded as below with reference to the accompanying drawings and preferred embodiments in order to further elaborate the technical means adopted by the disclosure to achieve the predetermined objective and the effects.

Figure 1:
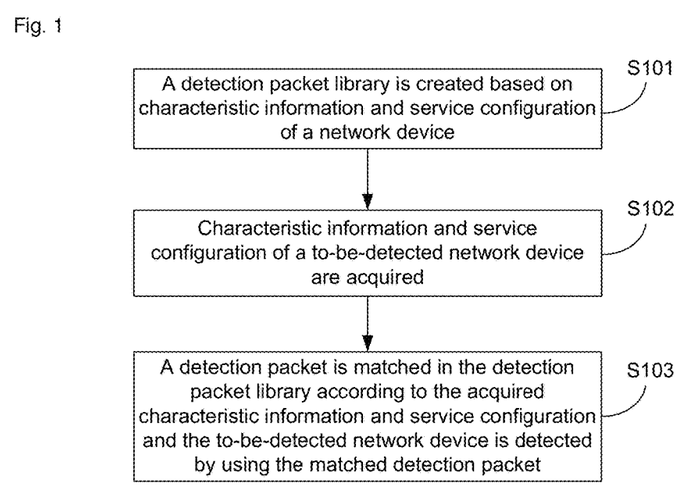
FIG. 1 is a flowchart of a method for detecting a network device according to the first embodiment of the disclosure.

As shown in FIG. 1, a method for detecting a network device according to the first embodiment of the disclosure includes the following specific steps.

Step 101: A detection packet library is created based on characteristic information and service configuration of a network device.

Specifically, the characteristic information of the network device may include the type and the model of the network device. The types of network devices may be divided according characteristic information. When the detection packet library is created, the type of service configuration of each network device at least includes one of the followings: interface information, configuration of an IP address, configuration of a VLAN, routing configuration, MPLS configuration, protocol configuration, and so on, wherein the protocol configuration includes IPsec configuration, configuration of a Remote Authentication Dial In User Service (RADIUS), configuration of a Point to Point Protocol over Ethernet (PPPoE), and so on.

Figure 2:
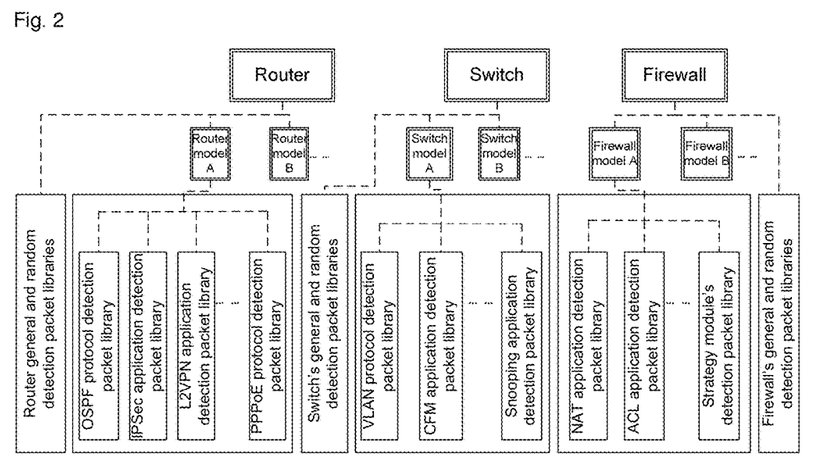
FIG. 2 is a schematic diagram of creation of a detection packet library according to an embodiment of the disclosure.

The type of the network device includes a switch, a router, a firewall and so on. FIG. 2 provides a schematic diagram of creation of a detection packet library. For a router type-network device, a detection packet library corresponding to service configuration of each type of router is created for the each type of router. For example, a detection packet library corresponding to a router of type A includes: an Open Shortest Path First (OSPF) protocol detection packet library, an IPsec application detection packet library, a Layer2 Virtual Private Network (L2VPN) application detection packet library based on an MPLS network, a PPPoE detection packet library and so on. Each detection packet library related to service configuration further contains several detection packets. For a switch type-network device, a detection packet library corresponding to service configuration of each type of switch is created for the each type of switch. For example, a detection packet library corresponding to a switch of type A includes: a VLAN protocol detection packet library, a Connectivity Fault Management (CFM) application detection packet library, a snooping detection packet library and so on. For a firewall type-network device, a detection packet library corresponding to service configuration of each type of firewall is created for the each type of firewall, for example, a detection packet library corresponding to a firewall of type A includes: a Network Address Translation (NAT) application detection packet library, an Access Control List (ACL) application detection packet library, a strategy module detection packet library and so on.

The detection packet library in the present embodiment may comprehensively cover all types of network devices and corresponding service configuration in the existing art.

Preferably, when the characteristic information and the service configuration of the network device change, the detection packet library may be maintained and updated. For example, when there are new network device and new service configuration, or when service configuration of a certain network device in a detection packet library created currently changes, a detection packet is added and/or deleted in the detection packet library accordingly.

Step 102: Characteristic information and service configuration of a to-be-detected network device are acquired.

Specifically, the characteristic information and the service configuration of the to-be-detected network device are mainly acquired through an SNMP, a NETCONFI protocol or a customer premise equipment wide area network management protocol TR-069, and may be also acquired manually or based on a WebGUI management method (a management system of open source codes of a website). Taking the SNMP method as an example, an SNMP port and a service of the network device are opened, and the characteristic information and the service configuration of the network device are acquired by sending an SNMP packet to the network device during implementation.

Step 103: A detection packet is matched in the detection packet library according to the acquired characteristic information and service configuration and the to-be-detected network device is detected by using the matched detection packet.

At the moment, whether a action of the network device is legal may be judged according to a response of the network device. Generally, the service configuration of the to-be-detected network device is overlapped with service configuration related to a detection packet of the network device in the detection packet library, which means that if overlapped, the detection packet may be matched, otherwise, the detection packet library needs to be updated to add a new service configuration detection packet.

Figure 3:
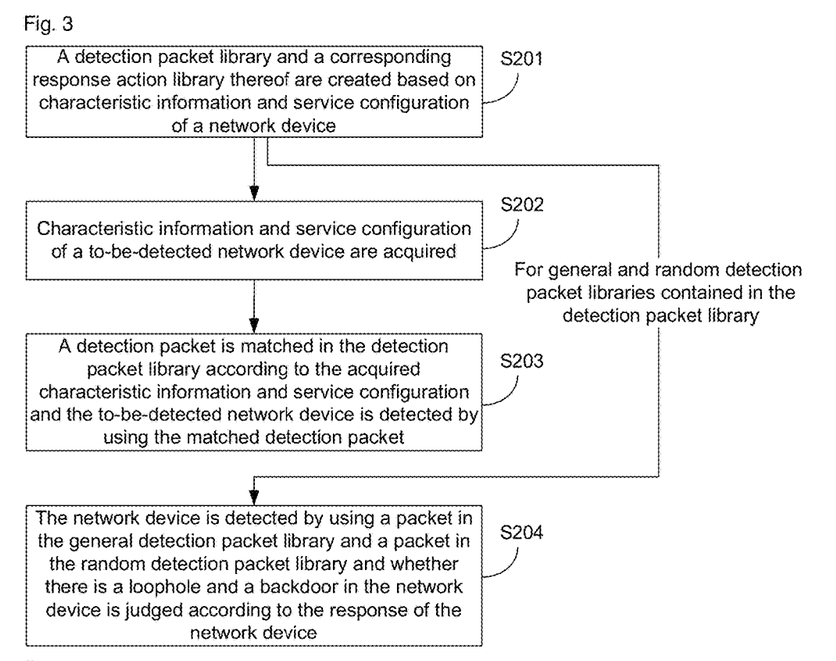
FIG. 3 is a flowchart of a method for detecting a network device according to the second embodiment of the disclosure.

As shown in FIG. 3, a method for detecting a network device according to the second embodiment of the disclosure includes the following specific steps.

Step 201: A detection packet library and a corresponding response action library thereof are created based on characteristic information and service configuration of a network device.

Specifically, a process of creating the detection packet library in the present embodiment is the same as that in the first embodiment.

More specifically, the characteristic information of the network device may include a type and a model of the network device. The types of network devices may be divided according characteristic information. When the detection packet library is created, the type of service configuration of each network device at least includes one of the followings: interface information, configuration of an IP address, configuration of a VLAN, routing configuration, MPLS configuration, protocol configuration, and so on, wherein the protocol configuration includes IPsec configuration, configuration of a RADIUS, configuration of a PPPoE, and so on.

The type of the network device includes a switch, a router, a firewall and so on. FIG. 2 provides a schematic diagram of creation of a detection packet library. For a router type-network device, a detection packet library corresponding to service configuration of each type of router is created for the each type of router, for example, a detection packet library corresponding to a router of type A includes: an OSPF protocol detection packet library, an IPsec application detection packet library, an L2VPN application detection packet library, a PPPoE detection packet library, and so on. Each detection packet library related to service configuration further contains several detection packets. For a switch type-network device, a detection packet library corresponding to service configuration of each type of switch is created for the each type of switch, for example, a detection packet library corresponding to a switch of type A includes: a VLAN protocol detection packet library, a CFM application detection packet library, a snooping detection packet library and so on. For a firewall type-network device, a detection packet library corresponding to service configuration of each type of firewall is created for the each type of firewall, for example, a detection packet library corresponding to a firewall of type A includes: an NAT application detection packet library, an ACL application detection packet library, a strategy module detection packet library, and so on.

The detection packet library in the present embodiment may comprehensively cover all types of network devices and corresponding service configuration in the existing art. Preferably, when the characteristic information and the service configuration of the network device change, the detection packet library may be maintained and updated. For example, when there are new network device and new service configuration, or when service configuration of a certain network device in a detection packet library created currently changes, a detection packet is added and/or deleted in the detection packet library accordingly.

Figure 4:
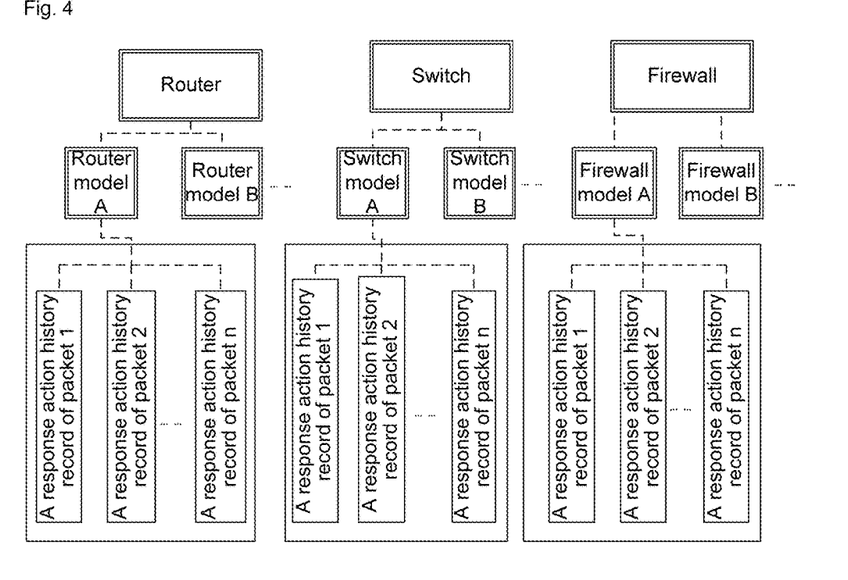
FIG. 4 is a schematic diagram of creation of a response action library according to an embodiment of the disclosure.

FIG. 4 provides a schematic diagram of creation of a response action library. A response action record in the response action library corresponds to a specific packet. Taking a switch type-network device as an example, there are response action records of n packets under a switch of type A. Packets 1 to 3 may belong to a VLAN protocol detection packet library, thus response action records of packets 1 to 3 correspond to packets 1 to 3 in the VLAN protocol detection packet library, respectively. Nevertheless, packets 4 to 6 may belong to a CFM application detection packet library, thus response action records of packets 4 to 6 correspond to packets 4 to 6 in the CFM application detection packet library, respectively. Further taking a router type-network device as an example, there are response action records of m packets under a router of type A. Packets 1 to 4 may belong to an OSPF protocol detection packet library, thus response action records of packets 1 to 4 correspond to packets 1 to 4 in the OSPF protocol detection packet library, respectively. The number of response action records of packets under the router of type A may be the same as or different from that under the switch of type A.

Step 202: Characteristic information and service configuration of a to-be-detected network device are acquired.

Specifically, the characteristic information and the service configuration of the to-be-detected network device are mainly acquired through an SNMP, a NETCONFI protocol or a customer premise equipment wide area network management protocol TR-069, and may be also acquired manually or based on a WebGUI management method (a management system of open source codes of a website).

Step 203: A detection packet is matched in the detection packet library according to the acquired characteristic information and service configuration of the to-be-detected network device is detected by using the matched detection packet.

Specifically, when the to-be-detected network device is detected, a response of the to-be-detected network device is compared with the response action library to judge whether a action of the network device is legal.

Three comparison processes are introduced into the present embodiment according to different compositions of the response action library.

Comparison process 1: The response action library includes: a manually-set first response action record, and second response action records stored after the detection.

The response of the to-be-detected network device is compared with the second response action records corresponding to the matched detection packet. If the response of the to-be-detected network device is consistent with a majority in the second response action records, it is determined that the action is legal. Otherwise, it is determined that the action is illegal. Here, the majority in the response action records refers to a response record having the largest number of identical responses among the response action records.

When a majority of consistent response action records cannot be distinguished from the second response action records corresponding to the matched detection packet, the response of the to-be-detected network device is compared with the first response action record. It is determined that the action is legal if the response is consistent with the first response action record and illegal otherwise.

Comparison process 2: The response action library includes second response action records stored after the detection.

The response of the to-be-detected network device is compared with the second response action records corresponding to the matched detection packet. If the response is consistent with a majority in the second response action records, it is determined that the action is legal. Otherwise, it is determined that the action is illegal.

When a majority of consistent response action records cannot be distinguished from the second response action records corresponding to the matched detection packet, a comparison result is directly determined to indicate that the action is legal.

Comparison process 3: The response action library includes a manually-set first response action record.

The response of the to-be-detected network device is compared with the first response action record corresponding to the matched detection packet. It is determined that the action is legal if the response is consistent with the first response action record and illegal otherwise.

Preferably, in Step 201, the detection packet library further includes a general detection packet library and a random detection packet library corresponding to the type of the network device. As shown in FIG. 2, the general detection packet library and the random detection packet library are divided according to the type of the network device. Following Step 201, the method of the present embodiment further includes:

Step 204: The network device is detected by using a packet in the general detection packet library and a packet in the random detection packet library and whether there is a loophole and a backdoor in the network device is judged according to a response of the network device.

Specifically, packets in corresponding general and random detection packet libraries are applied according to different types of to-be-detected network devices so as to detect the network devices. The general detection packet library may be provided with a corresponding response action library. The response of the network device is compared with the response action library of the general detection packet library subsequently, so as to judge whether the action of the network device is legal.

Whether there is a loophole and a backdoor in the network device is judged according to the response of the network device during detection applying a packet in the random detection packet library. For example, some network devices may send information of apparatuses to a designated port after receiving a certain random detection packet, which is called a backdoor of a network device.

Figure 5:
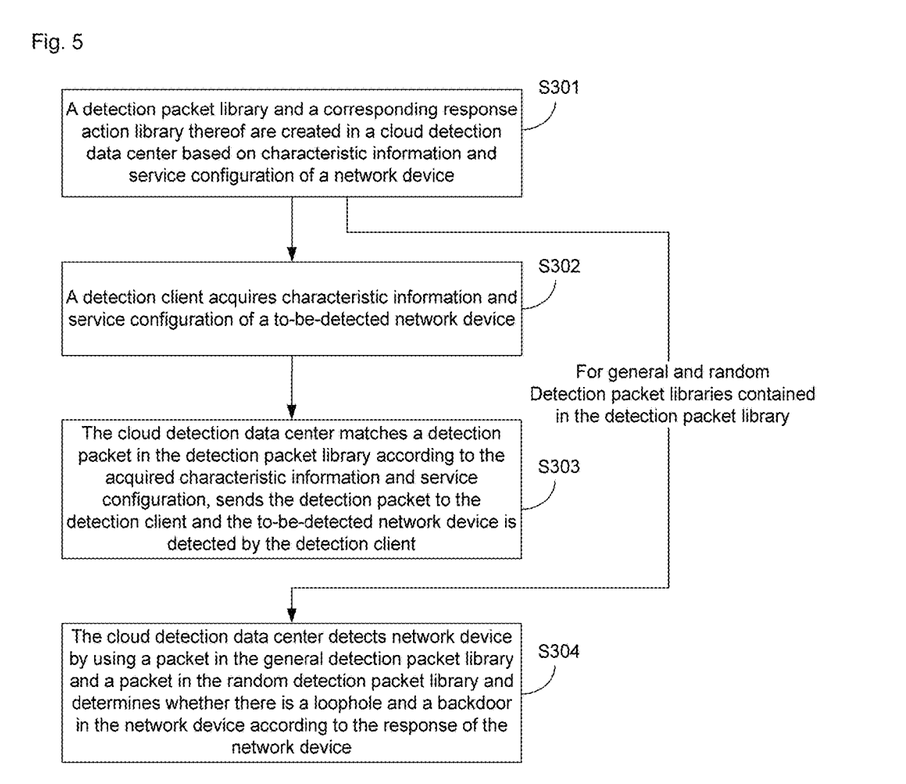
FIG. 5 is a flowchart of a cloud detection method for detecting a network device according to the third embodiment of the disclosure.

The third embodiment of the disclosure introduces a cloud detection data center and a detection client based on the second embodiment so that the cloud detection data center and the detection client can execute a detection process according to steps of the present embodiment which may be used as a preferred embodiment of the disclosure, that is, a method for detecting a network device, as shown in FIG. 5, including the following specific steps:

Step 301: A detection packet library and a corresponding response action library thereof are created in the cloud detection data center based on characteristic information and service configuration of a network device.

The detection packet library and the response action library are created in the cloud detection data center in the present step so as to edit and maintain a detection packet.

Step 302: The detection client acquires characteristic information and service configuration of a to-be-detected network device.

Specifically, the detection client mainly acquires the characteristic information and the service configuration of the to-be-detected network device through an SNMP, a NETCONFI protocol or a customer premise equipment wide area network management protocol TR-069, and may also acquire the characteristic information and the service configuration of the to-be-detected network device manually or based on a WebGUI management method (a management system of open source codes of a website). Taking the SNMP method as an example, an interface for physically connecting the network device and the detection client needs to open an SNMP port and a service during implementation, so as to acquire the characteristic information and the service configuration of the network device by sending an SNMP packet to the network device.

Step 303: The cloud detection data center matches a detection packet in the detection packet library according to the acquired characteristic information and service configuration, sends the detection packet to the detection client and the to-be-detected network device is detected by the detection client.

Specifically, when the to-be-detected network device is detected, the detection client sends the matched detection packet to the to-be-detected network device, and notifies a response of the to-be-detected network device to the cloud detection data center. The cloud detection data center compares the response of the to-be-detected network device with the response action library, so as to judge whether a action of the network device is legal, if so, outputs a log to the detection client, and otherwise, outputs a log together with an alarm to the detection client.

Three comparison processes are introduced into the present embodiment according to different compositions of the response action library created in the cloud detection data center.

Comparison process 1: The response action library includes: a manually-set first response action record, and second response action records stored after the detection.

The cloud detection data center compares the response of the to-be-detected network device with the second response action records corresponding to the matched detection packet, determines that the action is legal if the response is consistent with a majority in the second response action records, and otherwise, determines that the action is illegal. Here, the majority in the response action records refers to a response record having the largest number of identical responses among the response action records.

When a majority of consistent response action records cannot be distinguished from the second response action records corresponding to the matched detection packet, the cloud detection data center compares the response of the to-be-detected network device with the first response action record, determines that the action is legal if the response is consistent with the first response action record and illegal otherwise.

Comparison process 2: The response action library includes second response action records stored after the detection.

The cloud detection data center compares the response of the to-be-detected network device with the second response action records corresponding to the matched detection packet, determines that the action is legal if the response is consistent with a majority in the second response action records, and otherwise, determines that the action is illegal.

When a majority of consistent response action records cannot be distinguished from the second response action records corresponding to the matched detection packet, the cloud detection data center directly determines a comparison result to indicate that the action is legal.

Comparison process 3: The response action library includes a manually-set first response action record.

The cloud detection data center compares the response of the to-be-detected network device with the first response action record corresponding to the matched detection packet, determines that the action is legal if the response is consistent with the first response action record and illegal otherwise.

Preferably, in Step 301, the detection packet library further includes a general detection packet library and a random detection packet library corresponding to the type of the network device. As shown in FIG. 2, the general detection packet library and the random detection packet library are divided according to the type of the network device. Following Step 301, the method of the present embodiment further includes:

Step 304: The cloud detection data center detects a network device by using a packet in the general detection packet library and a packet in the random detection packet library and determines whether there is a loophole and a backdoor in the network device according to a response of the network device.

Specifically, the cloud detection data center applies packets in corresponding general and random detection packet libraries according to different types of to-be-detected network devices so as to detect the to-be-detected network devices. The packets in the general and random detection packet libraries are still sent to the to-be-detected network device by the detection client. A corresponding response action library may be created for the general detection packet library. The cloud detection data center compares the response of the to-be-detected network device with the response action library of the general detection packet library subsequently, so as to judge whether the action of the network device is legal, outputs a log to the detection client if the action is legal, and otherwise, outputs a log together with an alarm to the detection client.

Whether there is a loophole and a backdoor in the to-be-detected network device is judged according to the response of the to-be-detected network device subsequently during detection applying a packet in the random detection packet library.

Figure 6:
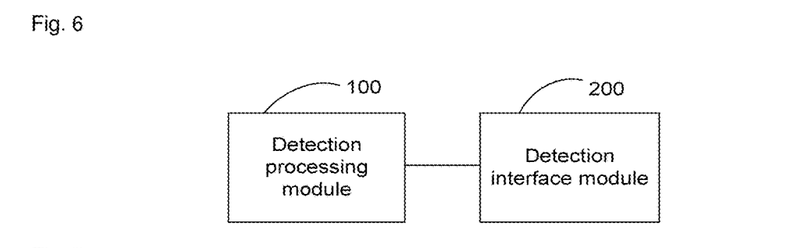
FIG. 6 is a schematic diagram illustrating components of a apparatus for detecting a network device according to the fourth and fifth embodiments of the disclosure.

As shown in FIG. 6, an apparatus for detecting a network device according to the fourth embodiment of the disclosure includes the following components.

A detection processing module 100, preferably located in a cloud detection data center and configured to create a detection packet library based on characteristic information and service configuration of a network device; match a detection packet in the detection packet library according to the characteristic information and the service configuration acquired by a detection interface module 200, send the detection packet to the detection interface module 200 to detect a to-be-detected network device through the detection interface module 200;

the detection interface module 200, preferably located in a detection client and configured to acquire characteristic information and service configuration of the to-be-detected network device and send the same to the detection processing module 100.

Specifically, the detection processing module 100 mainly acquires the characteristic information and the service configuration of the to-be-detected network device through an SNMP, a NETCONFI protocol or a customer premise equipment wide area network management protocol TR-069, and may also acquire the characteristic information and the service configuration of the to-be-detected network device manually or based on a WebGUI management method (a management system of open source codes of a website). The characteristic information of the network device may include a type and a model of the network device. The types of network devices may be divided according characteristic information. When the detection packet library is created, the type of service configuration of each network device at least includes one of the followings: interface information, configuration of an IP address, configuration of a VLAN, routing configuration, MPLS configuration, protocol configuration, and so on, wherein the protocol configuration includes IPsec configuration, configuration of a RADIUS, configuration of a PPPoE, and so on.

During practical application, the detection processing module 100 of the present embodiment may be implemented by a Central Processing Unit (CPU), a Digital Signal Processor (DSP) or a Field-Programmable Gate Array (PFGA) in the apparatus for detecting a network device, and the detection interface module 200 of the present embodiment may be implemented by an interface in the apparatus for detecting a network device.

As shown in FIG. 6, an apparatus for detecting a network device according to the fifth embodiment of the disclosure includes the following components.

A detection processing module 100, preferably located in a cloud detection data center and configured to create a detection packet library and a corresponding response action library thereof based on characteristic information and service configuration of a network device; match a detection packet in the detection packet library according to the characteristic information and the service configuration acquired by a detection interface module 200, send the detection packet to the detection interface module 200 to detect a to-be-detected network device through the detection interface module 200;

The detection interface module 200, preferably located in a detection client and configured to acquire characteristic information and service configuration of the to-be-detected network device and send the same to the detection processing module 100.

When the to-be-detected network device is detected, the detection interface module 200 is further configured to send the detection packet to the to-be-detected network device, and notify a response of the to-be-detected network device to the detection processing module 100.

Accordingly, the detection processing module 100 is further configured to compare the response of the to-be-detected network device with the response action library to judge whether a action of the network device is legal.

Three optional comparison methods are introduced into the present embodiment according to different compositions of the response action library.

Comparison method 1: The response action library includes a manually-set first response action record and second response action records stored after the detection.

The detection processing module 100 compares the response of the to-be-detected network device with the second response action records corresponding to the matched detection packet, determines that the action is legal if the response is consistent with a majority in the second response action records, and otherwise, determines that the action is illegal. Here, the majority in the response action records refers to a response record having the largest number of identical responses among the response action records.

When a majority of consistent response action records cannot be distinguished from the second response action records corresponding to the matched detection packet, the detection processing module 100 compares the response of the to-be-detected network device with the first response action record, determines that the action is legal if the response is consistent with the first response action record and illegal otherwise.

Comparison method 2: The response action library includes second response action records stored after the detection.

The detection processing module 100 compares the response of the to-be-detected network device with the second response action records corresponding to the matched detection packet, determines that the action is legal if the response is consistent with a majority in the second response action records, and otherwise, determines that the action is illegal.

When a majority of consistent response action records cannot be distinguished from the second response action records corresponding to the matched detection packet, the detection processing module 100 directly determines a comparison result to indicate that the action is legal.

Comparison method 3: The response action library includes: a manually-set first response action record.

The detection processing module 100 compares the response of the to-be-detected network device with the first response action record corresponding to the matched detection packet, determines that the action is legal if the response is consistent with the first response action record and illegal otherwise.

The creation of the detection packet library is as shown in FIG. 2. Preferably, the detection packet library further includes a general detection packet library and a random detection packet library corresponding to the type of the network device.

Accordingly, the detection processing module 100 is further configured to detect the network device by using a packet in the general detection packet library and a packet the random detection packet library and determine whether there is a loophole and a backdoor in the network device according to the response of the network device.

Specifically, the detection processing module 100 applies packets in corresponding general and random detection packet libraries according to different types of to-be-detected network devices so as to detect the to-be-detected network devices. The packets in the general and random detection packet libraries are still sent to the to-be-detected network device by the detection processing module 100. The general detection packet library may be provided with a corresponding response action library.

The detection processing module 100 compares the response of the to-be-detected network device with the response action library of the general detection packet library subsequently, so as to judge whether the action of the network device is legal, outputs a log to the detection client if the action is legal, and otherwise, outputs a log together with an alarm to the detection client.

Whether there is a loophole and a backdoor in the to-be-detected network device is judged according to the response of the to-be-detected network device during detection applying a packet in the random detection packet library.

During practical application, the detection processing module 100 of the present embodiment may be implemented by a CPU, a DSP or an FPGA in the apparatus for detecting a network device, and the detection interface module 200 in the present embodiment may be implemented by an interface in the apparatus for detecting a network device.

Figure 7:
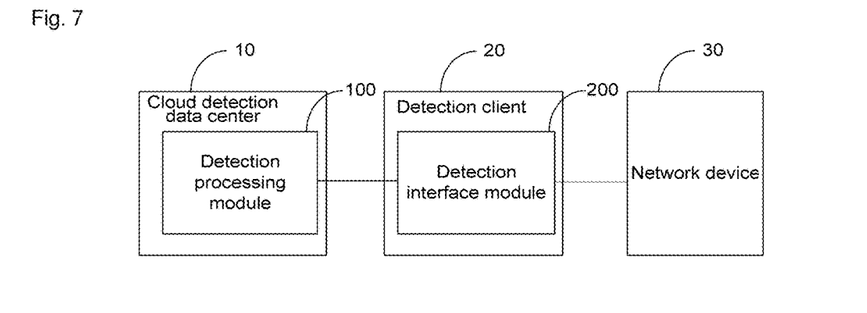
FIG. 7 is a schematic diagram illustrating components of a could detection system for detecting a network device according to the sixth embodiment of the disclosure.

As shown in FIG. 7, a cloud detection system for detecting a network device according to the sixth embodiment of the disclosure includes a cloud detection data center 10, a detection client 20 and network devices 30, wherein the cloud detection data center 10 is configured to create a detection packet library based on characteristic information and service configuration of each network device 30; match a detection packet in the detection packet library according to the characteristic information and the service configuration acquired by the detection client 20, send the detection packet to the detection client 20 and detect a to-be-detected network device 30 through the detection client 20;

the detection client 20 is configured to acquire characteristic information and service configuration of the to-be-detected network device 30 and send the characteristic information and the service configuration of the to-be-detected network device 30 to the cloud detection data center 10.

Here, a detection processing module 100 is located in the cloud detection data center 10 and is configured to create the detection packet library based on the characteristic information and the service configuration of each network device 30, match the detection packet in the detection packet library according to the characteristic information and the service configuration acquired by a detection interface module 200, send the detection packet to the detection interface module 200 and detect the to-be-detected network device 30 through the detection interface module 200;

the detection interface module 200 is located in the detection client 20 and is configured to acquire the characteristic information and the service configuration of the to-be-detected network device 30 and send the characteristic information and the service configuration to the detection processing module 100.

An application example of the disclosure will be introduced below based on the first embodiment to the sixth embodiment.

Figure 8:
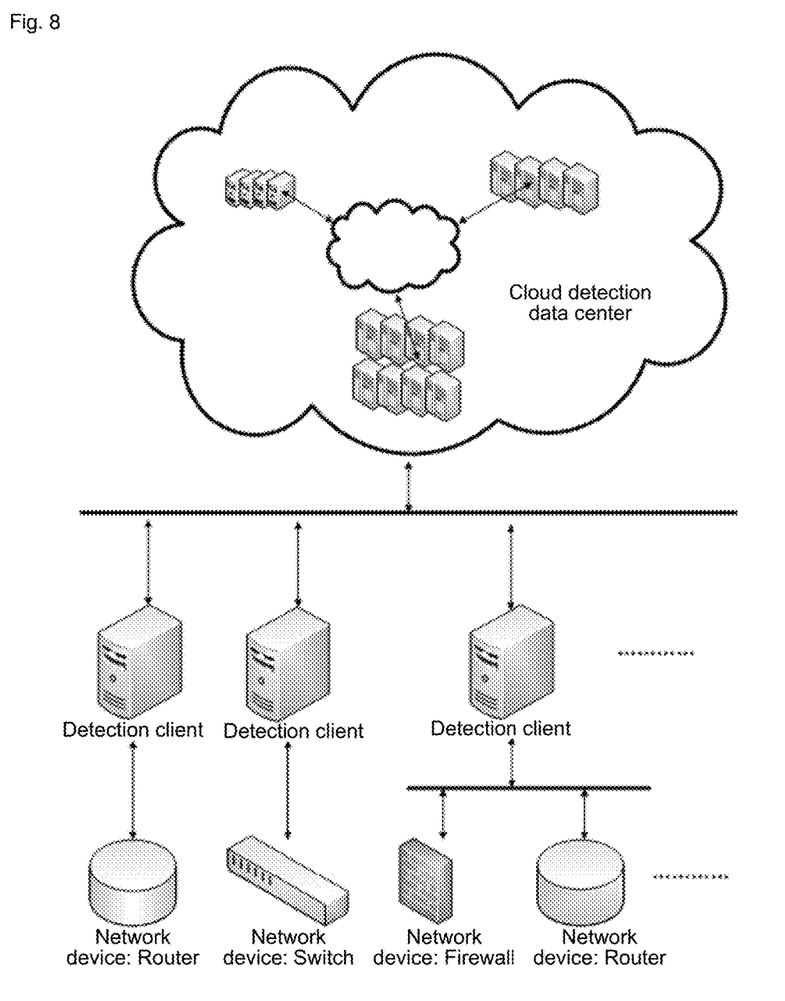
FIG. 8 is a topological structure diagram of a could detection system for detecting a network device according to an application example of the disclosure.

FIG. 8 is a topological structure diagram of a could detection system for detecting a network device according to an application example of the disclosure. Taking the case that a network device is a router as an example, FIG. 9 is a schematic diagram of a packet interaction process among a router, a detection client and a cloud detection data center in an application example of the disclosure.

Figure 9:
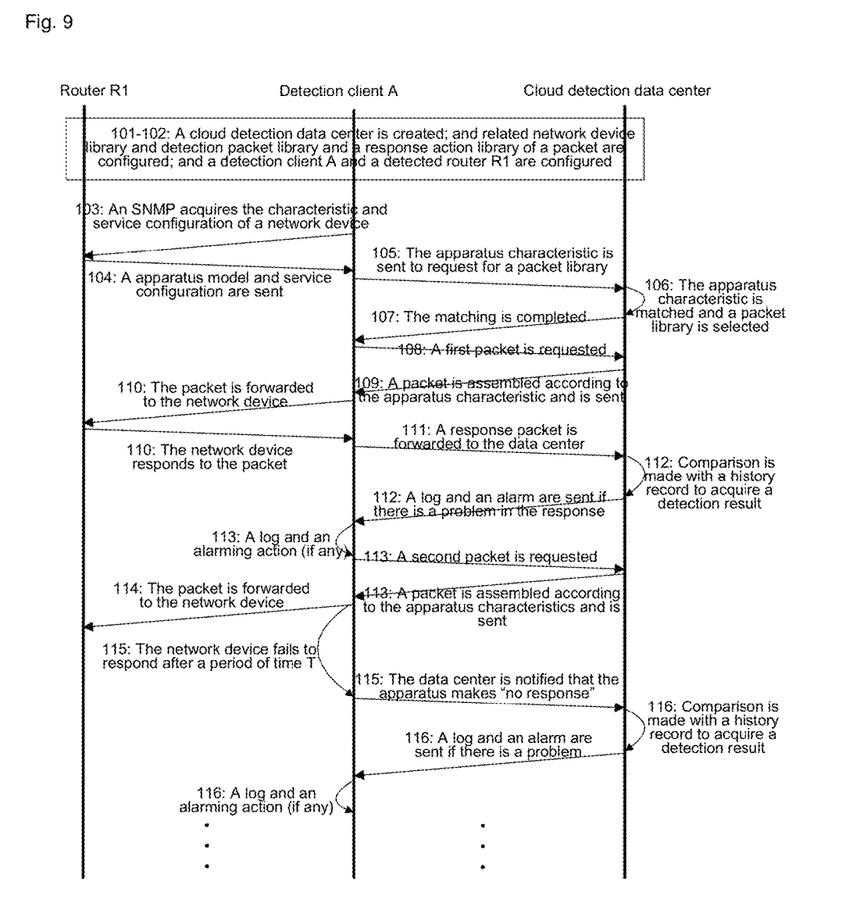
FIG. 9 is a flowchart of detecting a router in an application example of the disclosure.

As shown in FIG. 9, a process for detecting a router in the application example of the disclosure includes the following steps.

101: A cloud detection data center is created, and related network device library, detection packet library and response action library of a packet are configured.

102: A detection client A, and a detected router R1 are configured, and an IP address of the detected router R1 is 192.168.1.1.

103: The detection client A sends an SNMP request packet to the router R1 and the router R1 returns related configuration information to the detection client A.

104: The detection client A acquires that a model of the router R1 is an X series router and is configured with service configuration including NAT, OSPF and a Label-Switched Path (LSP) and so on.

105: The detection client A notifies acquired characteristic information and service configuration of the router R1 to the cloud detection data center.

106: The cloud detection data center analyzes the characteristic information and the service configuration of the router R1 and performs matching in the detection packet library.

107: The cloud detection data center notifies the detection client A that preparation has been completed.

108: The detection client A notifies the cloud detection data center to acquire a first detection packet.

109: The cloud detection data center packages a complete detection packet according to configuration information including a related MAC address and an IP address and so on of the router R1,and sends the detection packet to the detection client A.

110: After receiving the detection packet, the detection client A sends the detection packet to the detected router R1.The router R1 makes a response, and replies a response packet to the detection client A.

111: After receiving the response packet, the detection client A sends the response packet to the cloud detection data center.

112: The cloud detection data center compares the response packet with a record in the response action library, outputs a log to the detection client A if a action is legal, and outputs a log together with an alarm to the detection client A otherwise.

113: The detection client A processes the log and the alarm, and requests for a second detection packet, and the foregoing steps are repeated.

114: When the second detection packet is sent from the detection client A to the router R1,the router R1 does not respond.

115: After waiting for a pre-set period of time T, the detection client A notifies the cloud detection data center that the router R1 makes "no response".

116: The cloud detection data center compares the action of "no response" of the router R1 with a record in the response action library, outputs a log to the detection client A if the action is legal, and outputs a log together with an alarm to the detection client A otherwise.

A method, apparatus and a cloud detection system for detecting a network device according to the embodiments of the disclosure can discover a service loophole and a defect of the network device in a purposeful way.

The method, apparatus and the cloud detection system for detecting a network device according to the embodiments of the disclosure can discover a loophole and a backdoor of the network device by judging a detection result in the case that a general detection packet and a random detection packet are applied in the detection, thus further detecting the network device comprehensively and effectively.

The cloud detection system for detecting a network device of the embodiments of the disclosure creates a detection packet library in a cloud detection data center so as to facilitate editing and maintaining. In addition, compared with the prior art to customize and install scanning materials including a test case, a packet library, a loophole library, a plug-in library and so on in a detection client apparatus, a detection client of the embodiments of the disclosure can be connected to a cloud detection data center in real time to perform detection, thereby implementing good real time performance and interactivity of a detection result.

Those skilled in the art should understand that the embodiments of the disclosure may be provided as methods, systems, or computer program products. Thus, the disclosure may apply a hardware embodiment, a software embodiment or an embodiment combining software and hardware. Furthermore, the disclosure may apply a computer program product which is implemented on one or more computer-usable storage media (including but not limited to a magnet disk memory, an optical memory and the like) containing computer-usable program codes.

The disclosure is described with reference to flowcharts and/or block diagrams of methods, apparatuses (systems) and computer program products according to the embodiments of the disclosure. It should be understood that each flow and/or block in the flowcharts and/or block diagrams, and combinations of flows and/or blocks in the flowcharts and/or block diagrams, can be implemented by computer program instructions. These computer program instructions may be provided to a processor of a general purpose computer, a special purpose computer, an embedded processing machine or other programmable data processing apparatuses to produce a machine, such that the instructions, which are executed via the processor of the computer or other programmable data processing apparatuses, create a apparatus for implementing functions specified in one or more flows in the flowcharts and/or one or more blocks in the block diagrams.

These computer program instructions may be also stored in a computer-readable memory that can direct a computer or other programmable data processing apparatuses to function in a particular manner, such that the instructions stored in the computer-readable memory produce a manufacture including an instruction apparatus which implements functions specified in one or more flows in the flowcharts and/or one or more blocks in the block diagrams.

These computer program instructions may be also loaded onto a computer or other programmable data processing apparatuses so as to perform a series of operating steps on the computer or other programmable apparatuses to produce processing implemented by the computer, such that the instructions which are executed on the computer or other programmable apparatuses provide steps for implementing functions specified in one or more flows in the flowcharts and/or one or more blocks in the block diagrams.

Through illustration of specific embodiments, the technical means adopted by the disclosure to achieve the predetermined objective and the effects shall be understood more deeply and specifically. However, the accompanying drawings are only for reference and illustration, but are not intended to limit the disclosure.

What is claimed is:

1. A method for detecting a network device, comprising:
creating a detection packet library based on characteristic information and service configuration of a network device;
acquiring characteristic information and service configuration of a to-be-detected network device; and
matching a detection packet in the detection packet library according to the acquired characteristic information and service configuration of the to-be-detected network device, and detecting the to-be-detected network device by using the matched detection packet;
wherein the characteristic information of the network device comprises a type and a model of the network device; and
wherein the method further comprises:
creating a general detection packet library and a random detection packet library corresponding to the type of the network device; and
detecting the to-be-detected network device by using a packet in the general detection packet library and a packet in the random detection packet library, and judging whether there is a loophole and a backdoor in the to-be-detected network device according to a response of the to-be-detected network device.

2. The method for detecting a network device according to claim 1, further comprising: creating a response action library corresponding to the detection packet library based on the characteristic information and the service configuration of the network device;
accordingly, comparing the response of the to-be-detected network device with the response action library when detecting the to-be-detected network device, so as to judge whether an action of the detected network device is legal.

3. The method for detecting a network device according to claim 1, wherein the characteristic information and the service configuration of the to-be-detected network device are acquired through a Simple Network Management Protocol (SNMP), a Network Configuration (NETCONF) protocol or a customer premise equipment wide area network management protocol TR-069.

4. The method for detecting a network device according to claim 3, further comprising: maintaining and updating the detection packet library when the characteristic information and the service configuration of the network device change.

5. The method for detecting a network device according to claim 1, wherein
when the detection packet library is created, a type of the service configuration of the network device at least comprises one of following: interface information, configuration of an Internet Protocol (IP) address, configuration of a Virtual Local Area Network (VLAN), routing configuration, Multi-Protocol Label Switching (MPLS), or protocol configuration.

6. The method for detecting a network device according to claim 5, further comprising: maintaining and updating the detection packet library when the characteristic information and the service configuration of the network device change.

7. The method for detecting a network device according to claim 1, further comprising: maintaining and updating the detection packet library when the characteristic information and the service configuration of the network device change.

8. The method for detecting a network device according to claim 2, further comprising: maintaining and updating the detection packet library when the characteristic information and the service configuration of the network device change.

9. The method for detecting a network device according to claim 1, wherein the loophole and/or the backdoor corresponds to the to-be-detected network device sending information of apparatuses to a designated port after receiving a certain random detection packet.

10. An apparatus for detecting a network device, comprising a processor, and a memory storing instructions executable by the processor, wherein the processor is configured to:
create a detection packet library based on characteristic information and service configuration of a network device;
acquire characteristic information and service configuration of a to-be-detected network device;
match a detection packet in the detection packet library according to the acquired characteristic information and service configuration of the to-be-detected network device; and detect the to-be-detected network device by using the matched detection packet;

wherein the characteristic information of the network device comprises a type and a model of the network device; and wherein the processor is further configured to:
create a general detection packet library and a random detection packet library corresponding to the type of the network device; and detect the to-be-detected network device by using a packet in the general detection packet library and a packet in the random detection packet library, and judge whether there is a loophole and a backdoor in the to-be-detected network device according to a response of the to-be-detected network device.

11. The apparatus for detecting a network device according to claim 10, wherein the processor is further configured to create a response action library corresponding to the detection packet library based on the characteristic information and the service configuration of the network device; and compare the response of the to-be-detected network device with the response action library when the to-be-detected network device is detected, so as to judge whether an action of the detected network device is legal.

12. The apparatus for detecting a network device according to claim 11, wherein the processor is further configured to maintain and update the detection packet library when the characteristic information and the service configuration of the network device change.

13. The apparatus for detecting a network device according to claim 10, wherein the processor is configured to acquire the characteristic information and the service configuration of the to-be-detected network device through a Simple Network Management Protocol (SNMP), a Network Configuration (NETCONF) protocol or a customer premise equipment wide area network management protocol TR-069.

14. The apparatus for detecting a network device according to claim 10, wherein
when the detection packet library is created, a type of the service configuration of the network device at least comprises one of following: interface information, configuration of an Internet Protocol (IP) address, configuration of a Virtual Local Area Network (VLAN), routing configuration, Multiprotocol Label Switching (MPLS), or protocol configuration.

15. The apparatus for detecting a network device according to claim 10, wherein the processor is further configured to maintain and update the detection packet library when the characteristic information and the service configuration of the network device change.

16. The apparatus for detecting a network device according to claim 10, wherein the loophole and/or the backdoor corresponds to the to-be-detected network device sending information of apparatuses to a designated port after receiving a certain random detection packet.

17. A cloud detection system for detecting a network device, comprising a cloud detection data center, a detection client, and a network device, wherein
the cloud detection data center is configured to create a detection packet library based on characteristic information and service configuration of each network device; match a detection packet in the detection packet library according to the characteristic information and the service configuration acquired by the detection client; and send the detection packet to the detection client to detect a to-be-detected network device through the detection client;

the detection client is configured to acquire the characteristic information and the service configuration of the to-be-detected network device and send the characteristic information and the service configuration of the to-be-detected network device to the cloud detection data center;

the characteristic information of the each network device comprises a type and a model of the network device; and the cloud detection data center is further configured to:
create a general detection packet library and a random detection packet library corresponding to the type of the network device; and detect the to-be-detected network device by using a packet in the general detection packet library and a packet in the random detection packet library, and judge whether there is a loophole and a backdoor in the to-be-detected network device according to a response of the to-be-detected network device.

18. The cloud detection system for detecting a network device according to claim 17, wherein
the cloud detection data center is configured to create the detection packet library based on the characteristic information and the service configuration of the each network device; match the detection packet in the detection packet library according to the characteristic information and the service configuration of the to-be-detected network device, wherein the characteristic information and the service configuration of the to-be-detected network device are acquired by the detection client; and send the detection packet to the detection client to detect the to-be-detected network device through the detection client.

19. The cloud detection system for detecting a network device according to claim 17, wherein the loophole and/or the backdoor corresponds to the to-be-detected network device sending information of apparatuses to a designated port after receiving a certain random detection packet.

20. A non-transitory computer storage medium, comprising a group of instructions which, when executed, cause at least one processor to execute a method for detecting a network device, the method comprising:
creating a detection packet library based on characteristic information and service configuration of a network device;

acquiring characteristic information and service configuration of a to-be-detected network device; and matching a detection packet in the detection packet library according to the acquired characteristic information and service configuration of the to-be-detected network device, and detecting the to-be-detected network device by using the matched detection packet;

wherein the characteristic information of the network device comprises a type and a model of the network device; and wherein the method further comprises:
creating a general detection packet library and a random detection packet library corresponding to the type of the network device; and detecting the to-be-detected network device by using a packet in the general detection packet library and a packet in the random detection packet library, and judging whether there is a loophole and a backdoor in the to-be-detected network device according to a response of the to-be-detected network device.

21. The non-transitory computer storage medium according to claim 20, wherein the loophole and/or the backdoor corresponds to the to-be-detected network device sending information of apparatuses to a designated port after receiving a certain random detection packet.

* * * * *